United States Patent
Okamoto et al.

(10) Patent No.: US 12,498,257 B2
(45) Date of Patent: Dec. 16, 2025

(54) DISTRIBUTED ACOUSTIC SENSING DEVICE AND METHOD

(71) Applicant: NTT, Inc., Tokyo (JP)

(72) Inventors: Tatsuya Okamoto, Musashino (JP); Daisuke Iida, Musashino (JP); Hiroyuki Oshida, Musashino (JP)

(73) Assignee: NTT, Inc., Tokyo (JP)

( * ) Notice: Subject to any disclaimer, the term of this patent is extended or adjusted under 35 U.S.C. 154(b) by 279 days.

(21) Appl. No.: 18/020,969

(22) PCT Filed: Aug. 26, 2020

(86) PCT No.: PCT/JP2020/032231
§ 371 (c)(1),
(2) Date: Feb. 13, 2023

(87) PCT Pub. No.: WO2022/044174
PCT Pub. Date: Mar. 3, 2022

(65) Prior Publication Data
US 2023/0288231 A1    Sep. 14, 2023

(51) Int. Cl.
*G01D 5/353* (2006.01)
*G01H 9/00* (2006.01)

(52) U.S. Cl.
CPC ......... *G01D 5/35361* (2013.01); *G01H 9/004* (2013.01)

(58) Field of Classification Search
CPC ............................ G01D 5/35361; G01H 9/004
See application file for complete search history.

(56) References Cited

FOREIGN PATENT DOCUMENTS

JP    2016-161512 A    9/2016

OTHER PUBLICATIONS

Machine translation of JP2016161512 (Year: 2016).*
Mark Froggatt and Jason Moore, "High-spatial-resolution distributed strain measurement in optical fiber with Rayleigh scatter", Applied Optics 37.10 (1998): 1735-1740.

(Continued)

*Primary Examiner* — Walter L Lindsay, Jr.
*Assistant Examiner* — Andrew V Do
(74) *Attorney, Agent, or Firm* — Harness, Dickey & Pierce, P.L.C.

(57) ABSTRACT

An object of the present disclosure is to enable vibration analysis using a spectral shift under appropriate conditions depending on a measurement object.

According to the present disclosure, there is provided a vibration distribution measuring apparatus which measures backscattered light in an optical fiber to be measured a plurality of times at different times, extracts an optical spectrum of a window section determined from a plurality of backscattered light waveforms obtained by the measurement, and measures a vibration distribution in the optical fiber to be measured using optical spectra of the plurality of extracted backscattered light waveforms, in which the optical spectrum of the window section is calculated using the window section in which the vibration amplitude in the window section in the optical fiber to be measured is larger than a threshold value defined in the window section.

5 Claims, 11 Drawing Sheets

(56) References Cited

OTHER PUBLICATIONS

Yahei Koyamada et al., "Fiber-optic distributed strain and temperature sensing with very high measure and resolution over long range using coherent OTDR", Journal of Lightwave Technology 27.9 (2009): 1142-1146.

Okamoto Tatsuya et al: "Investigation of Tolerance of OFDR-Based DAS to Vibration-Induced Beat Frequency Offset", 2020 Optical Fiber Communications Conference and Exhibition (OFC), OSA, Mar. 8, 2020 (Mar. 8, 2020), pp. 1-3.

Okamoto Tatsuya et al: "Vibration-Induced Beat Frequency Offset Compensation in Distributed Acoustic Sensing Based on Optical Frequency Domain Reflectometry", Journal of Lightwave Technology, IEEE, USA, vol. 37, No. 18, Sep. 15, 2019 (Sep. 15, 2019), pp. 4896-4901.

Kreger Stephen T et al: "Distributed Rayleigh scatter dynamic strain sensing above the scan rate with optical frequency domain reflectometry", Proceedings of SPIE, IEEE, US, vol. 9480, May 13, 2015 (May 13, 2015), pp. 948006-948006.

* cited by examiner

DISTRIBUTED ACOUSTIC SENSING DEVICE AND METHOD

CROSS-REFERENCE TO RELATED APPLICATIONS

This application is a 371 U.S. National Phase of International Application No. PCT/JP2020/032231, filed on Aug. 26, 2020. The entire disclosure of the above application is incorporated herein by reference.

TECHNICAL FIELD

The present disclosure relates to a vibration distribution measuring apparatus and a method thereof.

BACKGROUND ART

In a Rayleigh scattered light, a spectrum shifts in response to a vibration. A distributed acoustic sensing (DAS), which analyzes vibration using the spectral shift, has been proposed (for example, refer to NPL 1).

In order to correctly measure the vibration, there are known a method using a sampling theorem in which a cycle of repeated measurement is made higher than a vibration frequency and a method using a spatial resolution in which a vibration analysis length is made shorter than a spatial expansion of vibration. However, the conditions for an amplitude of vibration are unclear.

CITATION LIST

Non Patent Literature

[NPL 1] Froggatt, Mark, and Jason Moore "High-spatial-resolution distributed strain measurement in optical fiber with Rayleigh scatter." Applied Optics 37.10 (1998): 1735-1740.

[NPL 2] Koyamada, Yahei, et al. "Fiber-optic distributed strain and temperature sensing with very high measure and resolution over long range using coherent OTDR." Journal of Lightwave Technology 27.9 (2009): 1142-1146.

SUMMARY OF INVENTION

Technical Problem

In a vibration analysis using a spectral shift, in order to correctly measure vibration, it is necessary to appropriately set a condition for the amplitude of the vibration to be measured. Therefore, an object of the present disclosure is to enable the vibration analysis using the spectral shift under appropriate conditions according to a measurement object.

Solution to Problem

A vibration distribution measuring apparatus of the present disclosure which
measures backscattered light in an optical fiber to be measured a plurality of times at different times,
extracts an optical spectrum of a determined window section from a plurality of backscattered light waveforms obtained by the measurement, and
measures a vibration distribution in the optical fiber to be measured using optical spectra of the plurality of extracted backscattered light waveforms,
In which the optical spectrum of the window section is calculated using the window section in which the vibration amplitude in the window section in the optical fiber to be measured is larger than a threshold value defined in the window section.

A vibration distribution measuring method of the present disclosure includes
measuring backscattered light in an optical fiber to be measured a plurality of times at different times, extracting an optical spectrum of a window section determined from a plurality of backscattered light waveforms obtained by the measurement, and
measuring a vibration distribution in the optical fiber to be measured by a vibration distribution measuring apparatus using optical spectra of the plurality of extracted backscattered light waveforms,
In which the optical spectrum of the window section is calculated using the window section in which the vibration amplitude in the window section in the optical fiber to be measured is larger than a threshold value defined in the window section.

Advantageous Effects of Invention

According to the present disclosure, it is possible to determine whether the DAS is applicable in consideration of an amplitude of vibration of a measurement object, and to optimize measurement conditions according to the measurement object.

DESCRIPTION OF EMBODIMENTS

Hereinafter, an embodiment of the present disclosure will be described in detail with reference to the drawings. The present disclosure is not limited to the embodiment described below. These implementation examples are only illustrative, and this disclosure can be carried out in a form with various changes and improvements based on the knowledge of those skilled in the art. Further, constituent elements with the same reference signs in the specification and the drawings are identical to each other.

(DAS Using OFDR)

Figure 1:
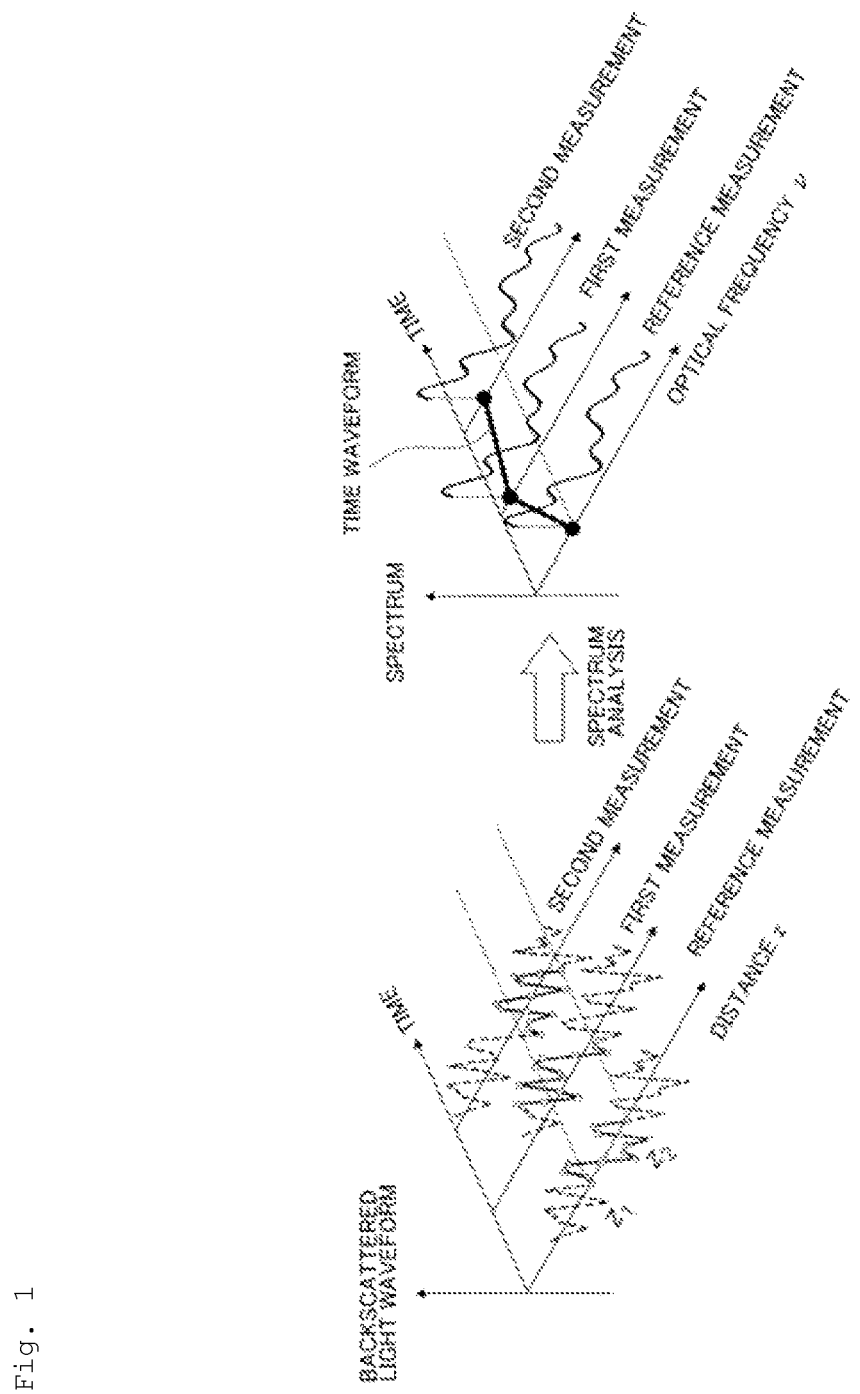
FIG. 1 shows an example of a spectrum measured in DAS.

FIG. 1 shows an example of the spectrum measured by a DAS. In the DAS, Rayleigh backscattered light from a plurality of different times is measured. Specifically, a reference measurement, a first measurement, and a second measurement are sequentially performed. Then, the spectrum (distortion) of the Rayleigh backscattered light waveform at distances $z_1 \sim z_2$ at each point of time is analyzed to measure the time waveform of the vibration. Rayleigh backscattered light can be measured using, for example, optical frequency domain reflectometry (OFDR).

Figure 2:
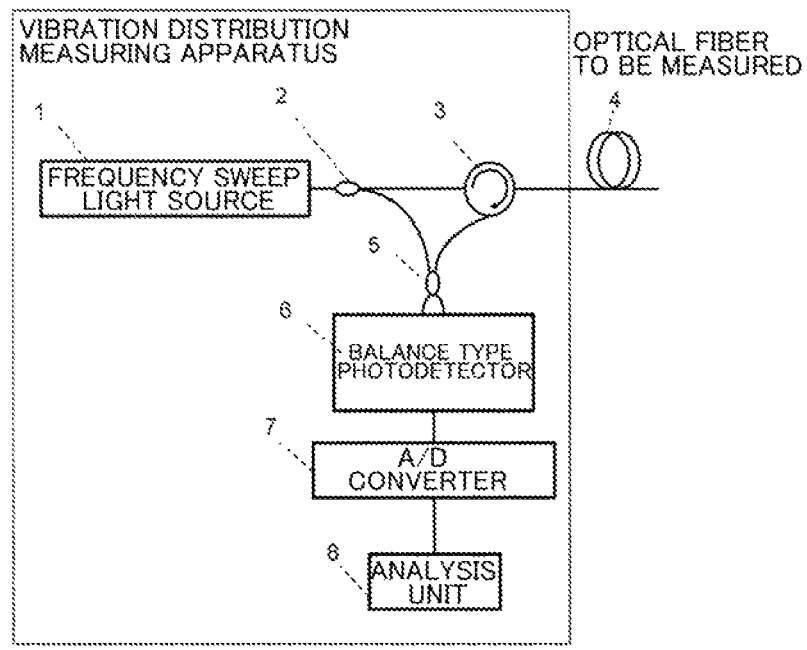
FIG. 2 illustrates an example of the configuration of an OFDR.

FIG. 2 shows an example of a system configuration according to the present disclosure. The vibration distribution measuring apparatus of the present disclosure is connected to an optical fiber 4 to be measured. The vibration distribution measuring apparatus of the present disclosure has a configuration similar to that of OFDR. Specifically, the vibration distribution measuring apparatus includes a frequency sweep light source 1, a coupler 2, a circulator 3, a coupler 5, a balance type photodetector 6, an A/D converter 7, and an analysis unit 8. The analysis unit 8 of the present disclosure can also be achieved by a computer and a program, and the program can be recorded in a recording medium or provided through a network.

The coupler 2 divides light from the frequency sweep light source 1 into a reference optical path for local light and a measurement optical path for probe light. The probe light divided into the measurement optical path enters an optical fiber 4 to be measured via the coupler 2 and the circulator 3. The coupler 5 multiplexes probe light which is backscattered light in the optical fiber 4 to be measured and local light divided by the coupler 2. The balance type photodetector 6 receives the interference light multiplexed by the coupler 5. The A/D converter 7 converts the output signal of the balance type photodetector 6 into a digital signal. The analysis unit 8 analyzes using the digital signal from the A/D converter 7.

The interference light incident on the balance type photodetector 6 has a beat frequency corresponding to the optical path length difference between the reference optical path and the measurement optical path. In the present disclosure, the backscattered light waveform in the optical fiber 4 to be measured is performed at least three times. The analysis unit 8 obtains an optical spectrum at a distance $z_1$ to $z_2$ in the optical fiber 4 to be measured using a time waveform of the interference light, and measures a vibration distribution in the optical fiber 4 to be measured on the basis of a temporal change of the optical spectrum. Thus, in the present disclosure, the vibration distribution in the optical fiber 4 to be measured is measured using the optical spectrum of a partial section defined by a window section in the optical fiber 4 to be measured.

The vibration analysis length w (light spectrum analysis length) obtained by the extraction of the window section is expressed by the following formula.

[Math. 1]

$$w = N\Delta z = N\frac{c}{2F} \quad (1)$$

Here, parameters art as fellows:
N: Score of Rayleigh scattered light wave
$\Delta z$: Spatial resolution of OFDR
c: Light Speed of optical fiber
F: Frequency sweep band of OFDR The spectral shift amount $\Delta v_{shift}$ due to distortion is represented by the following formula (NPL 2):

[Math. 2]

$$\Delta v_{shift} = 0.78\varepsilon v_0 \quad (2)$$

Here, par meters are, as follows:
$\varepsilon$: Distortion of optical fiber
$v_0$: Center frequency of probe light The optical frequency resolution $\Delta v$ of Rayleigh scattered light is expressed by the following formula.

[Math. 3]

$$\Delta v = \frac{c}{2w} = \frac{F}{N} \quad (3)$$

(Method for Designing Frequency Sensitivity)

Figure 3:
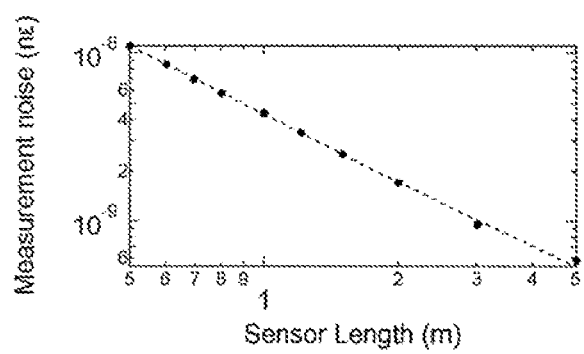
FIG. 3 shows an example of a relationship between a vibration analysis length w and a vibration amplitude of the measurement object.

FIG. 3 shows an example of a relationship between the analysis length w and the vibration amplitude of measurement object. ● represents the measured value. ε is a unit of strain representing an amount of expansion or contraction with respect to an original length. For example, when a length of 1 m expands or contracts 1 nm, it is expressed as distortion of 1 nε.

The frequency resolution $\Delta v$ of the optical spectrum of Rayleigh scattered light is given by the formula of (3). The higher the optical frequency resolution $\Delta v$ is, the higher the sensitivity of the spectral shift amount $\Delta v_{shift}$ due to distortion is. According to the formula of (3), the longer the analysis length w is, the higher the optical frequency resolution $\Delta v$ (sensitivity).

On the other hand, the spectrum shift with respect to the distortion of the Rayleigh scattered light spectrum is given by the formula (2): Hg2, and the spectral shift amount $\Delta v_{shift}$ is proportional to the distortion amount. Accordingly, as shown in FIG. 3, there is a trade-off relationship in which the longer the analysis length w, the higher the sensitivity for measuring a minute distortion (the smaller the noise of the measuring instrument), the lower the spatial resolution for analyzing the vibration.

Therefore,

The sensitivity to vibration amplitude and the vibration analysis length w are in a trade-off relationship.

The vibration analysis length w for correctly measuring the vibration needs to be smaller than the space expansion of the vibration which has been conventionally known, and needs to satisfy the condition of sensitivity to the vibration amplitude.

Figure 4:
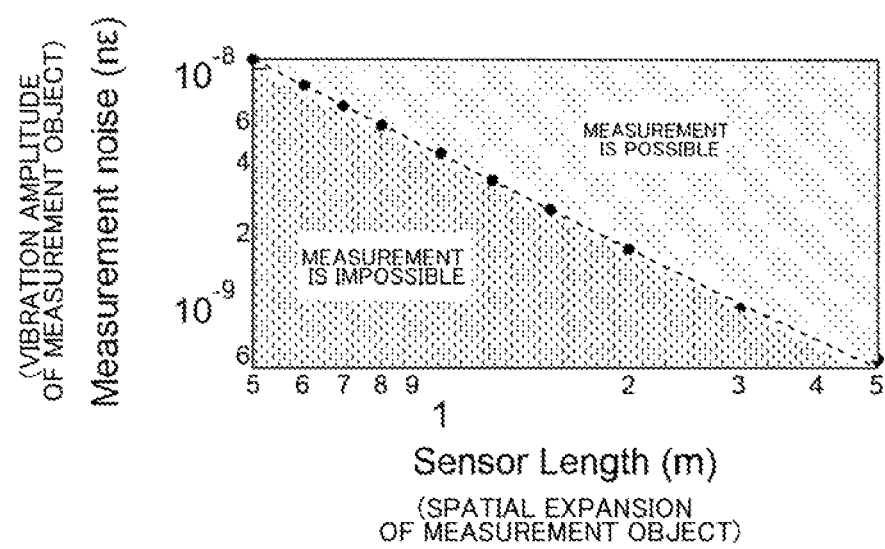
FIG. 4 shows an example of measurement conditions in the present disclosure.

Therefore, according to the present disclosure, it is determined whether the OFDR-DAS is applicable from the vibration characteristics of the measurement object. More specifically, as shown in FIG. 4, the optimum measurement conditions are set depending on the analysis length w, that is, the spatial expansion and vibration amplitude of the vibration of the measurement object. Specifically, the window section is set so that the vibration amplitude of the measurement object extracted in the window section is larger than a threshold value determined in the window section.

In order to measure the vibration, the following three conditions need to be satisfied.

(1) The window section w has a spatial frequency which is twice the wave number of the vibration to be measured, that is, the spatial frequency, or more. That is, the window section w is ½ times or smaller than the wavelength of the vibration.

(2) Measurement is performed at a repetition frequency of the probe light, which has a time frequency that is at least twice the frequency of the vibration to be measured, that is, the time frequency. That is, the measurement cycle is ½ times or smaller than the vibration cycle.

(3) The vibration sensitivity is higher than the amplitude of the vibration to be measured.

The window section w is related to the above-mentioned condition (1) and condition (3). Since the window section satisfying the condition (1) having the maximum width has high sensitivity to vibration, the optimum window section is ½ the wavelength of vibration. The spatial resolution of the OFDR determines the minimum value of the window section from the Formula (1). Therefore, the spatial resolution of the OFDR determines the minimum wavelength that can be measured.

Figure 5:
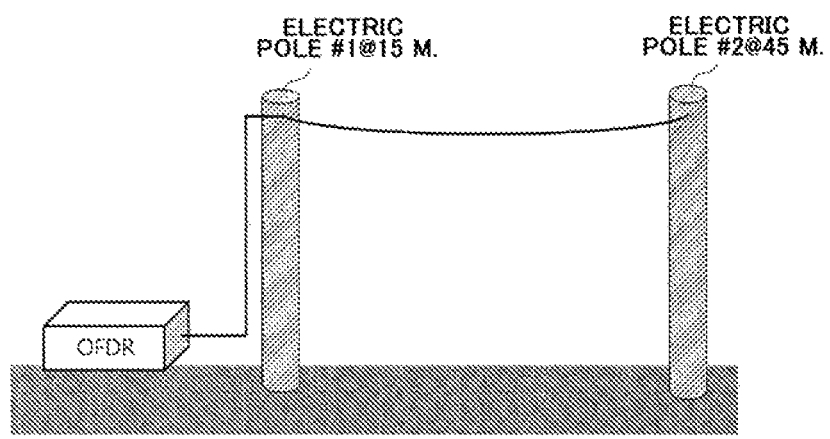
FIG. 5 is a measurement system used in an example of vibration distribution measurement.

Referring to FIGS. 5 and 6, an example of measurement of the vibration distribution of the overhead cable is shown. FIG. 5 shows a measuring system. A pole #1 is disposed at a position of a distance of 15 m from the OFDR, and a pole #2 is disposed at a position of a distance of 45 m from the OFDR. In this measurement system, the vibration distribution of the overhead cable between two poles #1 and #2 was measured.

Figure 6A:
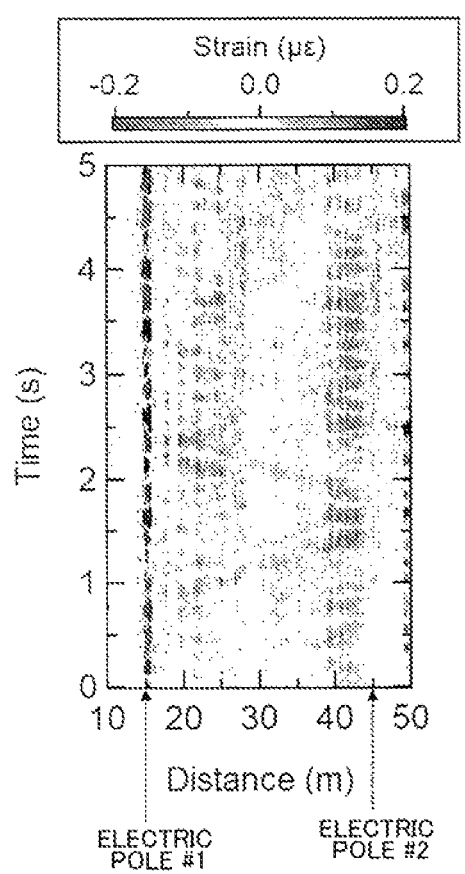
FIG. 6A is an example of measuring the vibration distribution when a spatial resolution is 0.8 m.
Figure 6B:
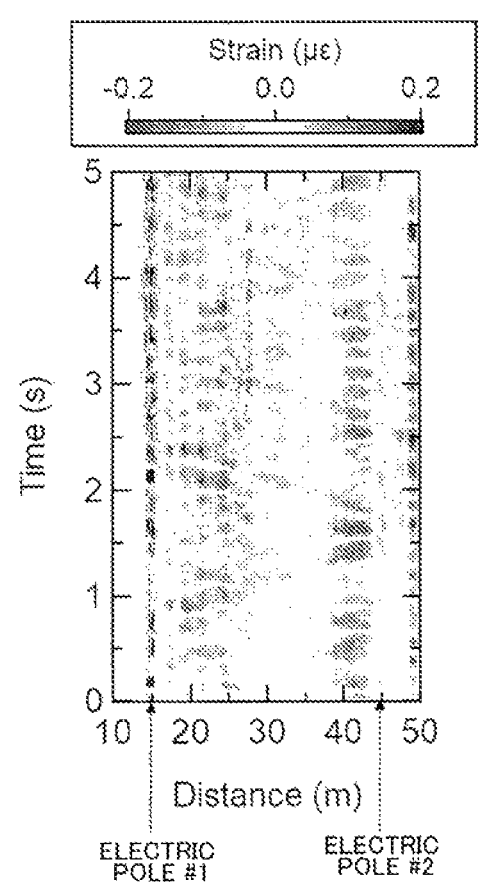
FIG. 6B is an example of measuring the vibration distribution when a spatial resolution is 1.6 m.
Figure 6C:
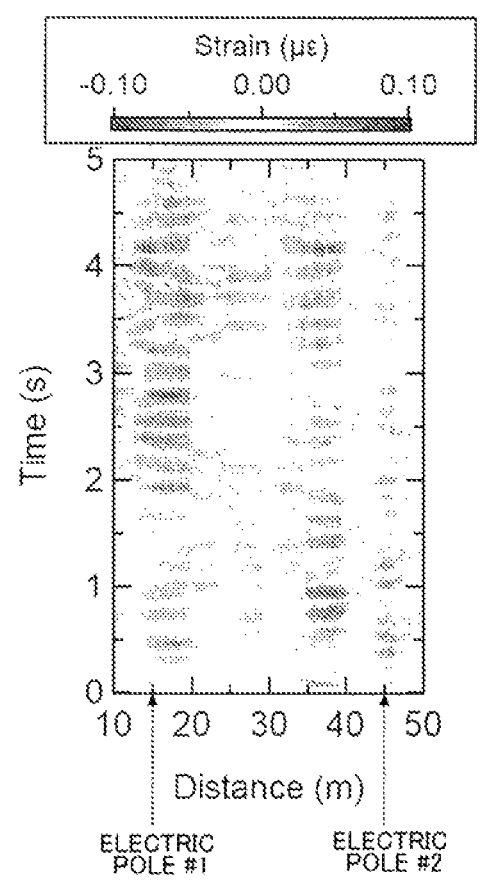
FIG. 6C is an example of measuring the vibration distribution when a spatial resolution is 9.5 m.

FIG. 6A shows a case where the spatial resolution $\Delta z$ is 0.8 m, FIG. 6B shows a case where the spatial resolution $\Delta z$ is 1.6 m, and FIG. 6C shows a case where the spatial resolution $\Delta z$ is 9.5 m. When the spatial resolution $\Delta z$ is 0.8 m, the measurement sensitivity is low and the SNR is low, as shown in FIG. 6A. When the spatial resolution $\Delta z$ is 1.6 m, both the spatial resolution and the sensitivity satisfy the measurement conditions as shown in FIG. 6B. When the spatial resolution $\Delta z$ is 9.5 m, as shown in FIG. 6C, the spatial resolution is large with respect to the spatial spread of the vibration to be measured, and the vibration distribution cannot be clearly measured.

As described above, the analysis unit 8 of the present disclosure calculates the optical frequency response of the window section, using the window section determined depending on the vibration amplitude of the measurement object in the optical fiber 4 to be measured. Thus, the present disclosure allows for correct measurement of vibration in the DAS.

Figure 7:
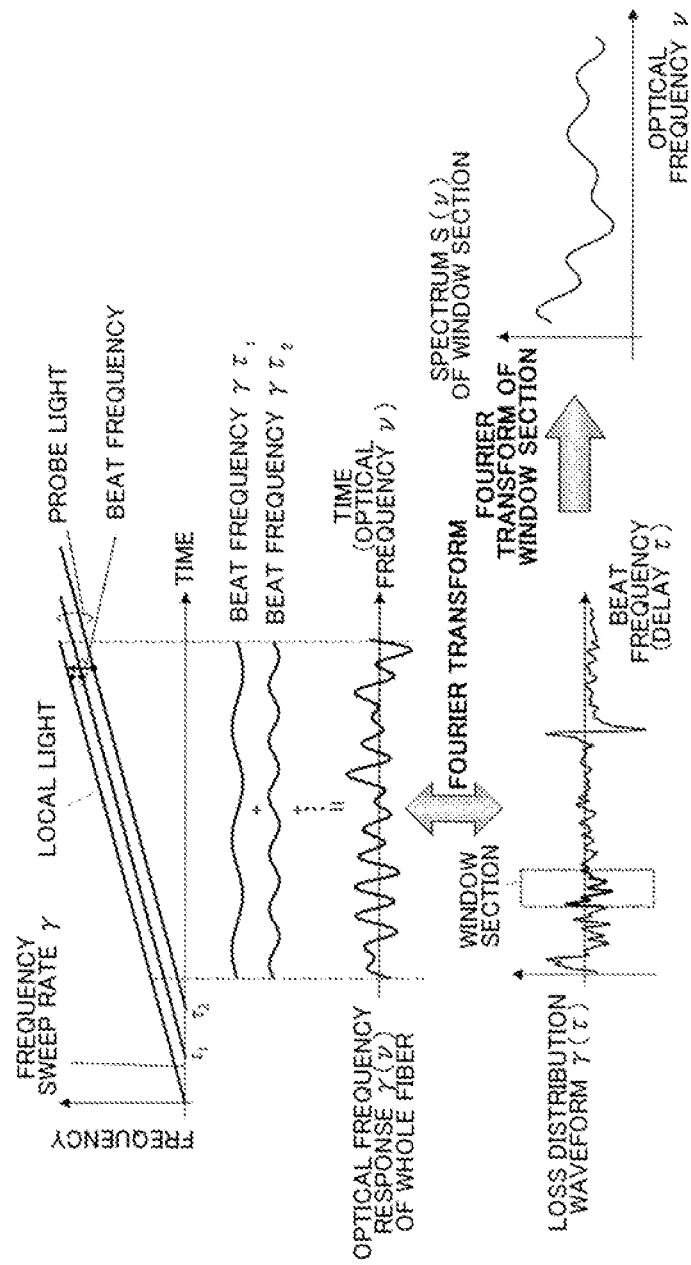
FIG. 7 shows an example of the spectrum measured using OFDR.

FIG. 7 shows an example of the spectrum measured using OFDR. In OFDR, the optical frequency response of the entire fiber is measured. Therefore, the optical spectrum of a section having the loss distribution waveform can be analyzed. For example, a Fourier transform is performed on the optical frequency response r(v) of the entire optical fiber, and a loss distribution waveform r($\tau$) is obtained. Further, a window section is determined using the loss distribution waveform r($\tau$) and a spectrum S(v) of the window section is obtained by performing a Fourier transform of the window section.

Figure 8:
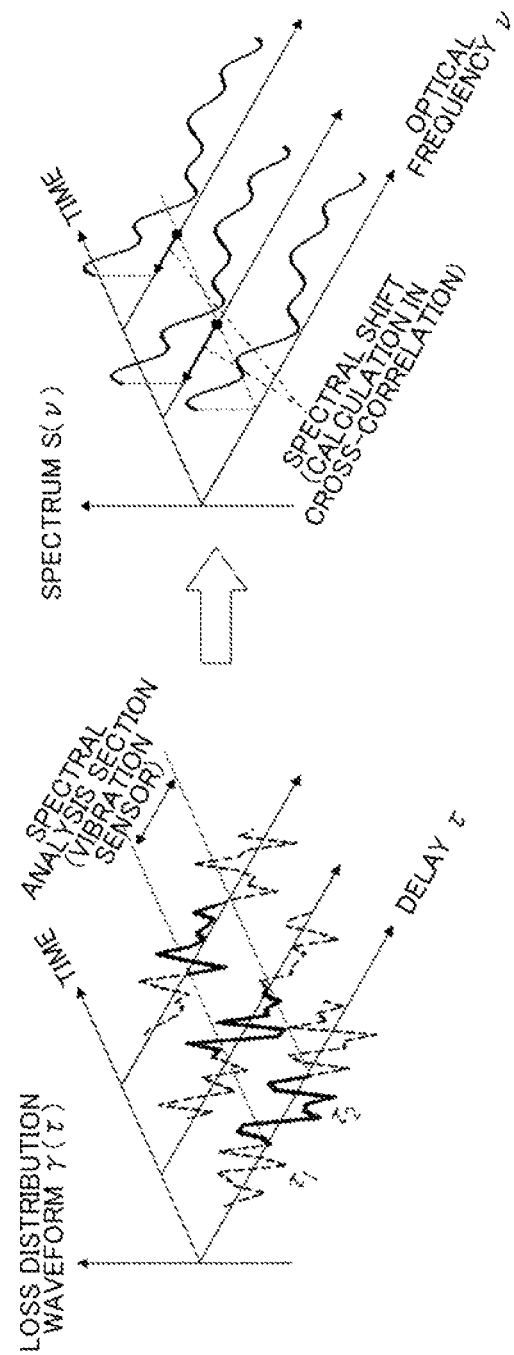
FIG. 8 shows an example of measurement of dynamic distortion (vibration) using a temporal change of the spectral shift.

On the other hand, the optical fiber can be modeled as an FBG having a random refractive index distribution. Therefore, as shown in FIG. 8, the spectrum analysis section can be designated, and the dynamic distortion (vibration) can be measured as the time change of the spectrum shift.

Figure 9:
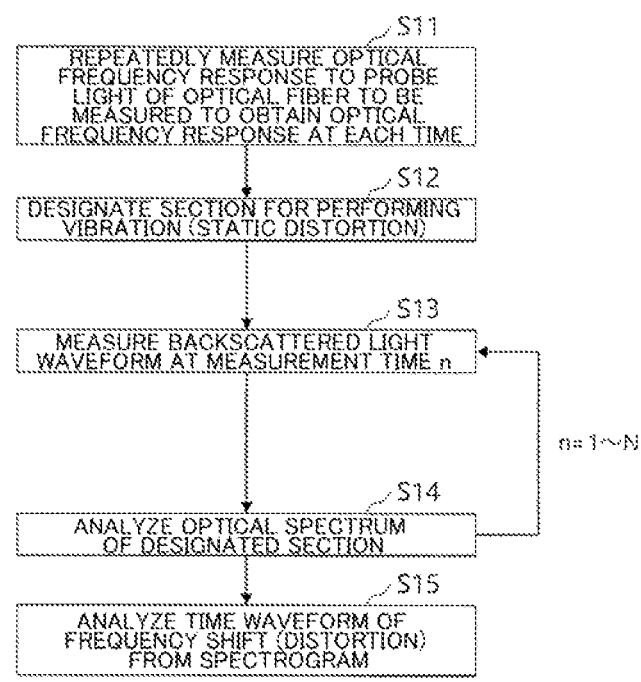
FIG. 9 shows an example of the configuration of the vibration distribution measuring method according to the present disclosure.

FIG. 9 shows an example of the vibration distribution measuring method according to the present disclosure. The vibration distribution measuring method according to the present disclosure includes executing steps S11 to S15 in order.

S11: An optical frequency response to the probe light of the optical fiber to be measured is repeatedly measured, and an optical frequency response r(v) of the entire optical fiber at each time is obtained.

S12: A window section for analyzing the vibration (static distortion) is designated.

S13: A backscattered light waveform at a measurement time n is measured.

S14: An optical spectrum of the designated section is analyzed.

S15: A time waveform of the frequency shift (distortion) is analyzed from the spectrogram.

In the present disclosure, in step S12, an optical frequency response r(v) is Fourier-transformed to a loss distribution waveform r($\tau$). Then, a window section is set using the amplitude of the loss distribution waveform r($\tau$). Then, the optical spectrum of the set window section is extracted from the loss distribution waveform r($\tau$) obtained through the reference measurement, the first measurement and the second measurement, and the vibration distribution of the measurement object in the optical fiber 4 to be measured is measured using the plurality of extracted optical spectra.

The window section is set to determine a spatial frequency and vibration sensitivity. If the vibration characteristics such as the wavelength and amplitude of the measurement object are known, the window section can be designated to satisfy the condition (1) and the condition (3) in the setting of the window section. When the vibration characteristics such as the wavelength and amplitude of the vibration to be measured are unknown, the window section is optimized according to the vibration characteristics by examining the window section, while changing the window section as shown in FIG. 6 in setting of the window section. Thus, according to the present disclosure, it can be determined whether the DAS can be applied in consideration of amplitude of vibration of the measurement object, and measurement conditions can be optimized depending on the measurement object.

INDUSTRIAL APPLICABILITY

The present disclosure is applicable to the information and communication industry, equipment monitoring, crime prevention, and disaster monitoring.

REFERENCE SIGNS LIST

1 Frequency sweep light source
2 Coupler
3 Circulator
4 Optical fiber to be measured
5 Coupler
6 Balance type photodetector
7 A/D converter
8 Analysis unit

The invention claimed is:

1. A vibration distribution measuring apparatus which measures backscattered light in an optical fiber to be measured a plurality of times at different times, comprising:
a processor; and
a storage medium having computer program instructions stored thereon, when executed by the processor, perform to:

measure backscattered light multiple times in a window section of the optical fiber, extract an optical spectrum from the measured backscattered light, determine a spectral shift in the optical spectrum extracted from the measured backscattered light, and determine vibration distribution of the optical fiber from the spectral shift in the optical spectrum, where size of the window section is set so that vibration amplitude of the optical fiber measured through the window section is larger than a threshold.

2. The vibration distribution measuring apparatus according to claim 1, wherein the backscattered light is an optical frequency response of a section extracted in a window section with respect to probe light, a loss distribution waveform of each backscattered light measured a plurality of times is generated using an optical frequency response of a section extracted in a window section with respect to the probe light, and an optical spectrum in the same window section is generated from each loss distribution waveform to extract an optical spectrum of a window section.

3. The vibration distribution measuring apparatus according to claim 2, wherein vibration in the optical fiber to be measured is measured using the spectral shift in the same window section.

4. The vibration distribution measuring apparatus according to claim 1 wherein size of window section is equal to or shorter than half wavelength of the vibration to be measured, and frequency of a probe light is equal to or higher than double frequency of the vibration to be measured.

5. A vibration distribution measuring method of a vibration distribution measuring apparatus comprising:

measuring backscattered light multiple times in a window section of the optical fiber;

extracting an optical spectrum from the measured backscattered light;

determining a spectral shift in the optical spectrum extracted from the measured backscattered light; and determining vibration distribution of the optical fiber from the spectral shift in the optical spectrum, where size of the window section is set so that vibration amplitude of the optical fiber measured through the window section is larger than a threshold.

* * * * *